W. SHURTLEFF.
ANTISIPHON SEAL FOR HEATING SYSTEMS.
APPLICATION FILED SEPT. 27, 1918.
1,304,612.
Patented May 27, 1919.
2 SHEETS—SHEET 1.
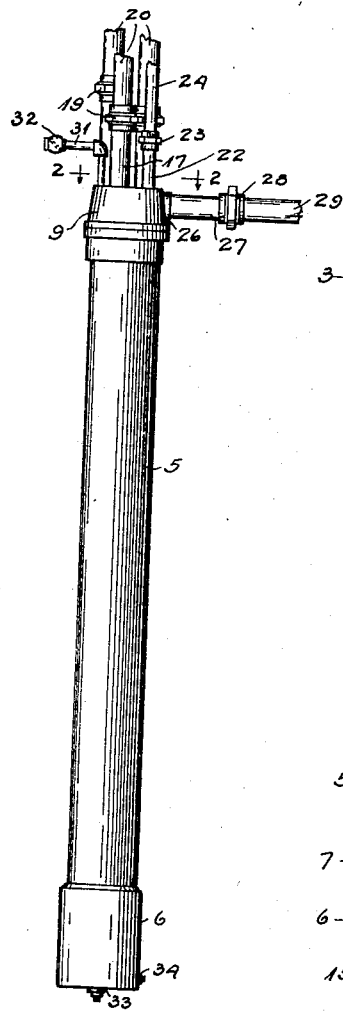
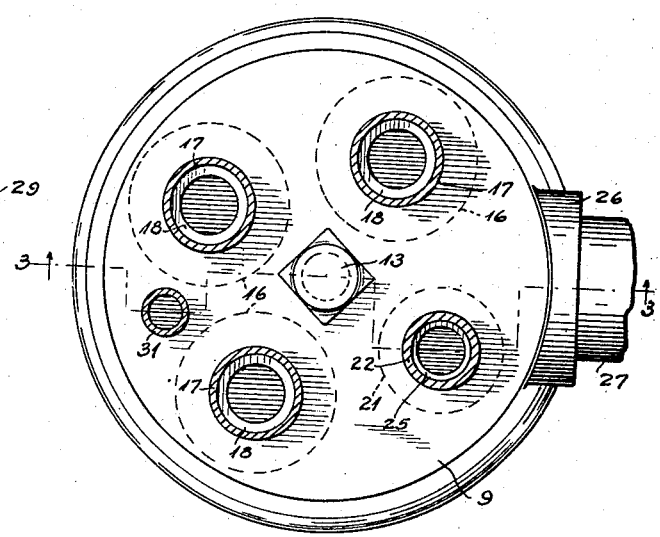
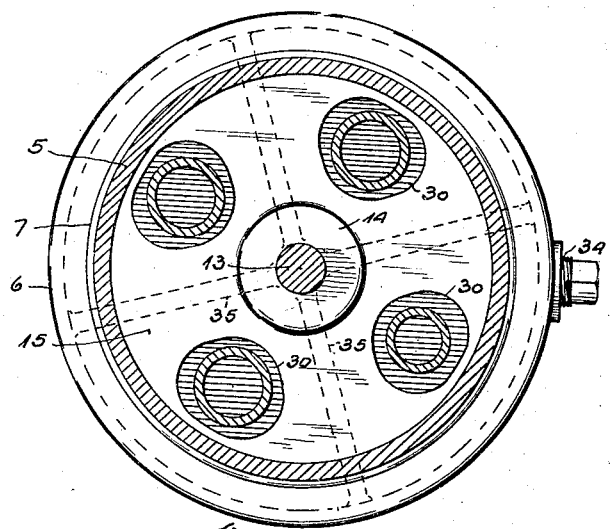
Inventor,
Wilfred Shurtleff
By James R. Offield
Atty.

W. SHURTLEFF.
ANTISIPHON SEAL FOR HEATING SYSTEMS.
APPLICATION FILED SEPT. 27, 1918.
1,304,612.
Patented May 27, 1919.
2 SHEETS—SHEET 2.
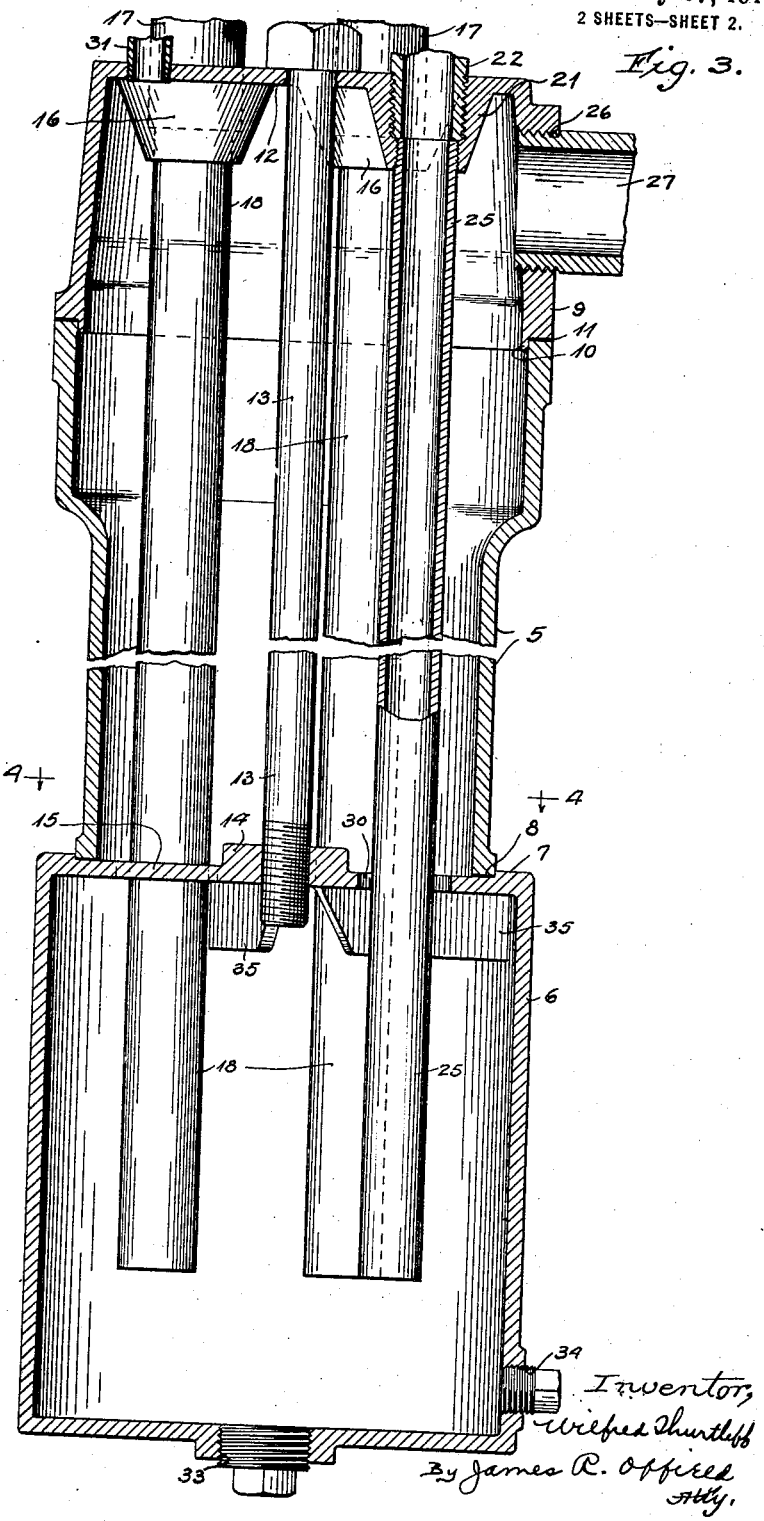

UNITED STATES PATENT OFFICE.

WILFRED SHURTLEFF, OF MOLINE, ILLINOIS, ASSIGNOR TO MOLINE HEAT, OF MOLINE, ILLINOIS, A CORPORATION OF ILLINOIS.

ANTISIPHON-SEAL FOR HEATING SYSTEMS.

1,304,612.  Specification of Letters Patent.  Patented May 27, 1919.

Application filed September 27, 1918. Serial No. 255,966.

*To all whom it may concern:*

Be it known that I, WILFRED SHURTLEFF, a citizen of the United States, and a resident of Moline, in the county of Rock Island and State of Illinois, have invented certain new and useful Improvements in Antisiphon-Seals for Heating Systems, of which the following is a specification.

My invention relates to anti-siphon seals for heating systems, its object being to produce improved construction and arrangement which will permit more efficient operation of the seal and which will render the seal more accessible for inspection or renewals.

The various features of my invention will be apparent from the following specification taken with the accompanying drawings in which drawings—

Figure 1 is an elevational view of a seal,

Fig. 2 is an enlarged plan view thereof,

Fig. 3 is an enlarged sectional view on plane 3—3, Fig. 2, and

Fig. 4 is a sectional view on plane 4—4, Fig. 3.

The cylindrical body 5 of the seal structure is of pipe-shape and rests at its lower end on the cylindrical base part 6, the top of the base having the annular flange 7 within which the lower end of the body part seats, preferably with the interposition of the gasket 8. At the top of the body part is supported the cap 9, the cap having the internal alining flange 10 and the gasket 11 being interposed between the cap and body. In the top of the cap is the central passageway 12 for the bolt 13 whose lower end threads through the boss 14 formed at the center of the top wall 15 of the base 6. This bolt securely ties the head, body and base parts together into a rigid structure.

Depending from the top wall of the cap are a number of bosses or lugs 16 each having a passageway therethrough tapped in its outer part for securing pipe sections 17, and also tapped at their inner ends for supporting drop pipes 18. In practice the pipes 17 are connected by unions 19 with the drips 20 leading from the low pressure supply and return mains or the air and water return main of a heating system. Another tap opening 21 is also shown from which a pipe 22 extends to be connected by a union 23 with the drip pipe 24 leading from the air relief valve (not shown). Secured in the lower end of the tap 21 is the drop pipe 25. The side of the cap has the threaded opening 26 in which is secured the pipe stub 27 connected by coupling 28 with the pipe 29 which connects with the pump and water receiver.

The various drop pipes 18 and 25 extend downwardly to within a short distance of the bottom of the base 6, the top wall 15 of the base having the openings 30 therethrough through which the pipes extend, these openings being a trifle larger than the pipes to more or less restrict the flow of water between the base and the body parts of the seal structure. The drip water from the various pipes of the heating system soon fill the seal well and the overflow returning through pipe 29 to the water receiver. In order to prevent siphoning of the seal an air intake pipe 31 is connected with the interior of the cap 9 above the water level, and has a check valve 32 at its end which is set so that air may be drawn into the space above the water. This check valve will also prevent the escape of any steam which may reach the space above the water.

The water of condensation coming from the steam supply mains is much higher in temperature than the water of condensation coming from the air and water return mains. As these waters are both discharged into the base 6 of the seal there is a tendency, on account of the difference in pressure, to create what is called "water bubbles." Unless guarded against these water bubbles interfere with the proper functioning of the seal and the steam would not be held back. The formation of water bubbles is prevented in my improved seal by the restricted passageways 30 which provide a practically closed water chamber at the lower end of the seal. The waters of different temperature flowing into this lower chamber will be retained and retarded and will mix to a great extent before rising through the restricted passageways into the body section 5 of the seal, such passage through the restricted passageways causing the further and practically complete mixture of the waters of different temperature and the formation of water bubbles is prevented. The base section 6 acts also as a mud drum, clean-out plugs 33 and 34 being provided.

My improved construction in which the cap, body and base parts are separably held together by a bolt 13 eliminates the need of pits or sewer tiles for installing the seals. The seals can be buried directly in the ground. Upon loosening of the various unions and unscrewing of the bolt 13 the cap with the drop pipes thereon can be withdrawn from the seal body and inspection, renewals, or repairs can readily and quickly be made. In order to strengthen against strain caused by the bolt 13 the wall 15 of the base part 6 is reinforced by ribs 35.

My improved seal is particularly adaptable for use in steam or vapor heating systems where the pressure is substantially the same as that of the atmosphere or only a few pounds thereover. I do not desire to be limited to the exact details of construction and arrangement shown and described as modifications are no doubt possible which would still come within the scope of the invention. I claim as follows:

1. In a device of the class described, the combination of a well comprising upper and lower compartments, drop pipes extending through the upper compartment and into the lower compartment, there being only restricted passageway between said compartments.

2. In a device of the class described, the combination of a well comprising upper and lower compartments, the upper wall of said lower compartment having passageways, drop pipes extending downwardly through said upper compartment and through said passageways into the lower compartments for discharging water into the lower compartment, said passageways restricting the flow of water between the compartments, and an overflow outlet at the upper end of the upper compartment.

3. In a device of the class described, the combination of a base part having passageways in its upper wall, a body part mounted on and secured to said base part, drop pipes suspended from the top of said body part and extending downwardly through said passageways and into the base part, the relative sizes of said passageways and said pipes passing therethrough being such that the flow between the base part and the body part is restricted, and an overflow outlet from the top of the body part.

4. In a device of the class described, the combination of a base part, a body part mounted thereon, a screw extending centrally through said body part and threading into the base part to secure said parts together, drop pipes extending through the body part and into the base part, and an overflow outlet at the upper end of said body part.

5. A device of the class described comprising a base part, a body part and a cap part, a bolt connecting said cap part with the base part to lock said parts together to form a well, and drop pipes extending through said body and base parts, there being an overflow outlet from said cap part.

6. A device of the class described comprising a base part, a body part and a cap part, said parts being detachably held together to form a well, drip pipes adapted at their upper ends for connection with piping of a heating system and extending downwardly through said body part into the base part, there being an overflow outlet from the cap part.

7. A device of the class described comprising a base part, a body part and a cap part, a bolt extending through the parts and connecting with the cap part and base parts to clamp the body part therebetween, said parts forming a well, drip pipes suspended from the cap part and extending through the body part into the base part, and an overflow outlet from the upper end of said well.

8. A device of the class described comprising a base part, a body part and a cap part, a bolt extending axially through said parts with its head engaging the cap part and its threaded end engaging in the upper wall of the base part whereby said cap, body and base part are clamped together in axial alinement to form a well, drop pipes extending from the cap part through the body part and through the upper wall of the base part into the interior of said base part, there being restricted passageway through the upper wall of said base part for the flow of water between said base and body parts, and an overflow outlet at the upper end of the well.

9. A device of the class described comprising a base part, a body part and a cap part, a single bolt locking said parts together in axial alinement, drop pipes secured to the cap part and extending downwardly through the body part and into the base part, there being an overflow outlet at the upper part of the well.

10. In a device of the class described, the combination of a base part, a top part mounted on said base part, drop pipes extending through said top part and into the base part, a water outlet at the upper end of said top part, restricted passageway for water flow between said base part and top part, said base part except for said restricted passageway being entirely closed and forming a mixing chamber for water received through said drop pipes.

11. In a device of the class described, the combination of a base part, a top part mounted on said base part, drop pipes extending through said top part and into the base part, a water outlet at the upper end of said top part, restricted passageway for water flow between said base part and the top part, said base part except for said restricted passageway being entirely closed and forming a mixing chamber for water received through said drop pipes, an air inlet to said top part above the water level therein for preventing siphoning, and a check valve for preventing outward flow through said inlet.

12. A device of the class described comprising a well having a chamber near its bottom connected only by restricted passageway with the space above, drop pipes extending downwardly through said well to discharge into the bottom chamber, and an overflow outlet at the upper end of said well.

13. A device of the class described comprising a well having a chamber near its bottom connected only by restricted passageway with the space above, drop pipes extending downwardly through said well to discharge into the bottom chamber, an overflow outlet at the upper end of said well, and an air inlet to the space above the water level.

In witness whereof, I hereunto subscribe my name this 24th day of September, A. D. 1918.

WILFRED SHURTLEFF.

Copies of this patent may be obtained for five cents each, by addressing the "Commissioner of Patents, Washington, D. C."